United States Patent [19]

Causa et al.

[11] Patent Number: 5,513,683

[45] Date of Patent: May 7, 1996

[54] TIRES MADE USING ELASTOMERS CONTAINING SPRINGY FIBERS

[75] Inventors: Alfredo G. Causa, Akron; Christina H. Obermaier, Stow; Marc Borowczak, N. Canton, all of Ohio

[73] Assignee: The Goodyear Tire & Rubber Company, Akron, Ohio

[21] Appl. No.: 269,726

[22] Filed: Jul. 1, 1994

[51] Int. Cl.$^6$ .............................. B60C 9/00; B60C 13/00; B60C 15/06

[52] U.S. Cl. .................... 152/209 R; 152/458; 152/525; 152/541

[58] Field of Search .................................. 152/458, 451, 152/527, 525, 541, 209 R; 57/902, 254; 428/362, 361, 295

[56] References Cited

U.S. PATENT DOCUMENTS

| | | | |
|---|---|---|---|
| 1,803,129 | 4/1931 | Palmer | 474/263 |
| 3,043,357 | 7/1962 | Bagnuk et al. | 152/458 |
| 3,070,871 | 1/1963 | Ryckebosch | 57/902 |
| 3,620,280 | 11/1971 | Marzocchi | 152/458 |
| 3,682,221 | 8/1972 | Marzocchi et al. | 152/458 |
| 3,895,665 | 7/1975 | Heling et al. | 152/458 |
| 4,514,541 | 4/1985 | Francis | 524/514 |
| 5,052,458 | 10/1991 | Bajer | 152/458 |
| 5,225,457 | 7/1993 | Borowczak et al. | 523/318 |
| 5,388,627 | 2/1995 | Nakada | 152/458 |

FOREIGN PATENT DOCUMENTS 2144055  3/1973  Germany ................................ 152/458

OTHER PUBLICATIONS

Tensil Strength and Ultimate Elongation of Rubber–Fibrous Compositions, VV Moshev, 1980 Gordon & Breach Sci. Publ.
Introduction to Rubber Compounding, Robert W. Layer, The Vanderbilt Rubber Handbook 1990.
Short Fiber Reinforced Elastomers, Rubber Chem. & Tech. 1983, pp. 619–638.
Effects of Matrix Characteristics in the Processing of Short Fiber Comp., J C Seferis/L. Nicolais, Plenum Publ. Corp. 1983, pp. 289–318, L. A. Goettler.
Short Fiber Reinforced Hose–a New Concept in Production and Performance, Rubber Chem & Tech. 52, No. 4 Sep./Oct. 1979 pp. 838–863, L. A. Goettler, R. I. Leib and A. J. Lambright.
Extrusion of Fiber–Reinforced Polymer Systems, Encycloyedia of Materials Sci & Engr., M. B. Ever, Pergamon Press 1086, pp. 1599–1600. L. A. Goettler.
Short Fiber–Rubber Composites, Handbook of Elastomers, New Developments and Tech., A. K. Bhowmick & H. L. Stephens, Marcel Dekker, Inc 1988 Ch 7 pp. 215–248, L. A. Goettler.
Short Fiber Reinforcement of Extruded Rubber Profiles, Rubber World, Oct. 1982, pp. 33–42, L. A. Goettler, J. A. Sezna and P. J. DiMauro.
Elastomer Reinforcement with Short Kevlar Aramid Fiber for Wear Applications, Rubber World Oct. 1987, K. R. Watson and A. Frances.
Kevlar Short Fiber Reinforcement of Elastomer Matrices, Internationale Kautschuk–Tagung, 24, No. 27, Jun. 1991 pp. 41–44, Th. F. Schuller.
Inter. J. Polymeric Mater., 1980, vol. 8, pp. 165–173, Gordon and Breacb Science Publishers, Inc., Great Britain.
The Vanderbilt Rubber Handbook, Thirteenth Edition, 1990, pp. 10–13, R. T. Vanderbilt Company, Inc.
O. G. Abstract of U.S. Patent, 5,187,845, Feb. 23, 1993.

*Primary Examiner*—Geoffrey L. Knable
*Attorney, Agent, or Firm*—David E. Wheeler

[57] ABSTRACT

Springy fibers, when used as a fiber reinforcement in an elastomer, have been found to demonstrate reduced crack propagation in the elastomer. Springy fiber reinforced elastomers can be used in tires in various components.

7 Claims, 9 Drawing Sheets

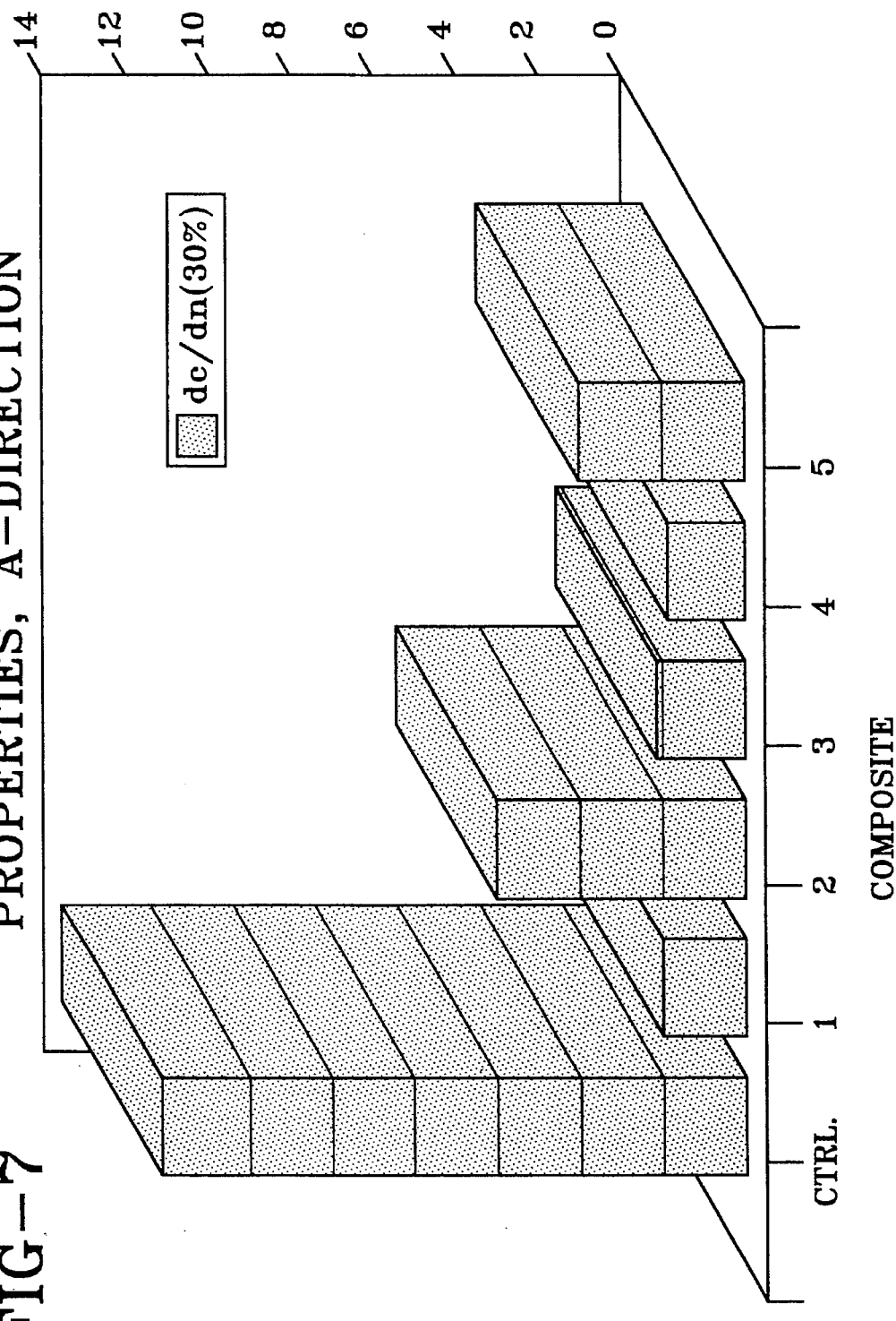

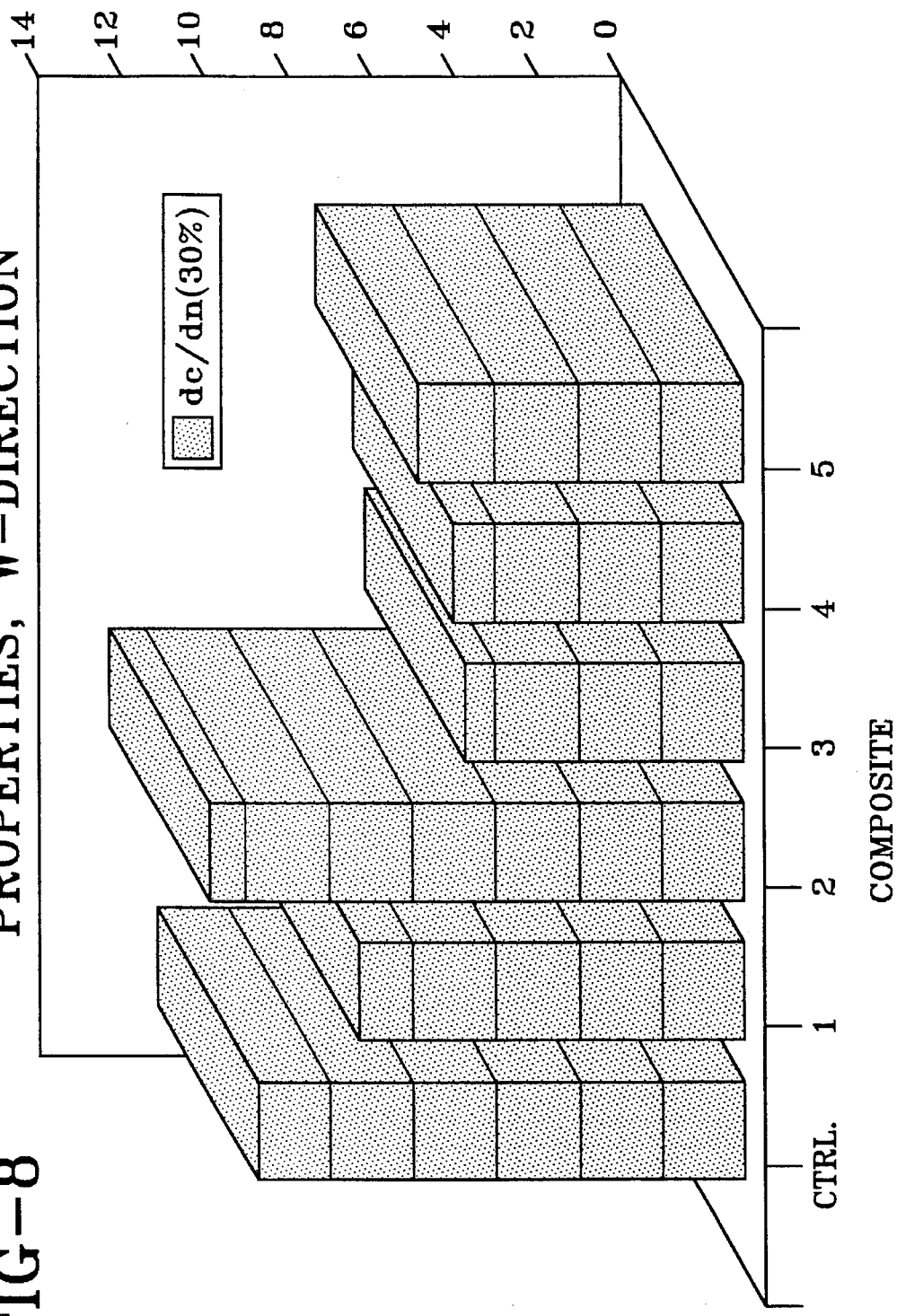

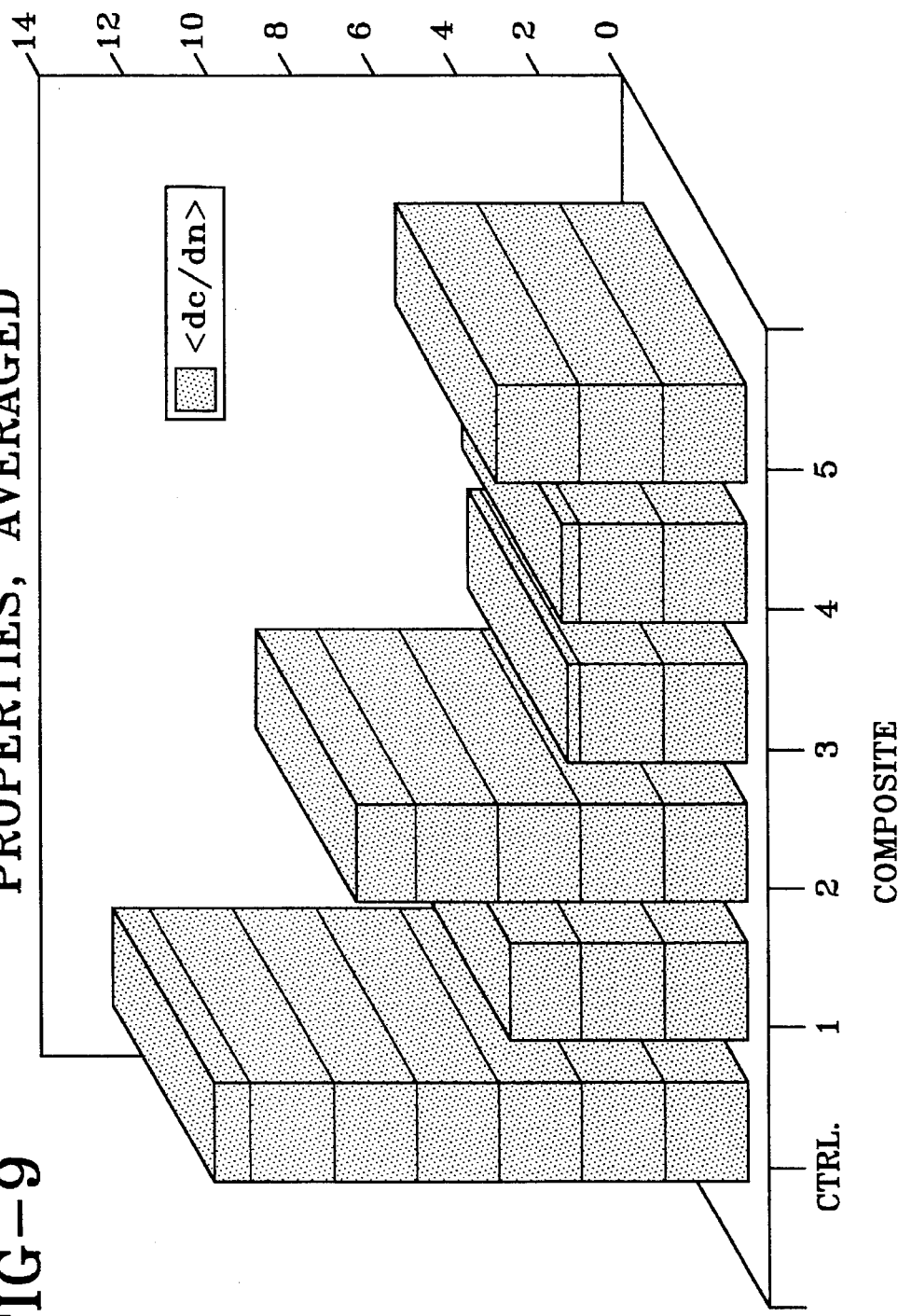

5,513,683

TIRES MADE USING ELASTOMERS CONTAINING SPRINGY FIBERS

BACKGROUND OF THE INVENTION

The present invention relates to fiber reinforced elastomers, and tires made using fiber reinforced elastomers.

The presence of short fibers in a cured rubber compound results in a pronounced increase in initial and low strain (low elongation) modulus, and of course a steeper stress/strain (or load elongation) curve, and higher bending stiffness. In general, the enhancement in stiffness is limited by the ability to uniformly disperse and properly orient the required amount of short fiber.

Concomitantly, the presence of short fibers in the rubber may sometimes result in reduced fatigue endurance and in higher hysteretic heat build-up under periodic stresses, especially if the fibers are not well bonded to the rubber.

Since the rubber in a rolling tire undergoes periodic deformations, for example, it is desirable that the fatigue fracture properties of a short fiber reinforced composite, to be used for such a purpose, be at least equal to those of the unreinforced rubber matrix.

Various discontinuous short fibers have been used to enhance both stiffness and modulus of rubber vulcanizates. For example, discontinuous cellulose fibers have been used as dispersions in rubber as disclosed in U.S. Pat. Nos. 3,697,364, 3,802,478 and 4,236,563. Other discontinuous fibers have been suggested or used such as, for example, aramid, aliphatic polyamide (nylon), cotton, rayon, polyester, glass, carbon and steel.

International patent application WO 90/04617 to Allied Signal Inc. teaches the preparation of partially oriented yarn short fibers and discloses that such short fibers can be used in tires.

Normally, where discontinuous fibers are used, the rubber composite also contains a particulate reinforcement in combination therewith.

Many macro fibers, in the form of strands of woven yarns, are well known as fibrous reinforcing agents.

Short fibers (having a length of about 100 to 12,000 μm, a diameter of 1.2 to 1,250 μm and an aspect ratio of about 25 to 1000) are conventionally made by cutting an assembly of long continuous filaments or a monofilament into the desired short lengths. The filaments are conventionally made using a melt spinning or a solvent spinning process. In the melt spinning process molten polymer is extruded through a plate, called a spinneret, usually into air, and while the molten filaments are cooling, the filaments are stretched, in a spin draw technique, to their maximum extent (e.g. a draw ratio of about 5 to 1 for nylon). In the spin draw process, spinning and drawing are accomplished on the same machine at the same time, and the resulting fibers are said to be fully oriented. Polyester, nylon, and polyolefins are well known examples of melt-spun fibers. Fully oriented fibers can also be produced by conventional random-coil solution spinning, either via a dry or wet spinning technique, followed by mechanical drawing. Wet spinning is commonly used to make viscose rayon fibers. Fully oriented, extended-chain crystalline fibers can be prepared by spinning liquid crystalline melts or solutions of stiff chain polymers, known respectively as thermotropic and lyotropic polymers. An example of a fiber spun from a liquid crystalline solution of a rigid, rod-like aromatic polyamide (aramid), via the dry jet (air-gap) wet spinning technique is Kevlar® made by E. I. DuPont de Nemours & Co., Inc., Wilmington, Del. When spinning liquid crystalline melts or solutions, only the spinning process is required and drawing is not necessary to obtain fully or highly oriented fibers. All of these highly oriented, stiff-chain polymer fibers can be cut, chopped or crushed to provide short fibers or pulp.

A detailed description of other fully oriented fibers that can be converted into short fibers or pulp can be found in "An Overview of Fiber Reinforcement in Tires", "Tire Technology International'93", U.K & International Press, pp 28–34, by A. G. Causa, and references cited therein.

Although elastomers reinforced with short fibers, for example aramid pulp, demonstrate good stiffness as measured by the tensile modulus at 50% strain, tested at 20 inches/min at room temperature, they have a limited strength as measured by the ultimate tensile strength as tested at the above conditions, unless special conditions are imposed to assure good adhesion between the short fibers and the elastomer matrix. As the loading of aramid in an elastomer increases, the stiffness of the elastomer increases while the fracture resistance decreases, and processing of the compound becomes even more difficult. For some applications, it may not be possible to obtain a suitable balance between stiffness and crack growth resistance for an elastomer using fully oriented short fibers.

In addition, because of the relatively weak bond between fiber and rubber at the fiber/rubber interface, and because of the vastly different extensibility of the rubber and the fiber, fiber loaded rubber composites containing large fiber loads sometimes exhibit poor cut growth properties.

It is an object of the present invention to provide means for reinforcing an elastomer matrix whereby a good balance of desired properties in the elastomer matrix is obtained.

A tire made using the reinforced matrix of the invention is also provided.

Other objects of the invention will be apparent from the following description and claims.

SUMMARY OF THE INVENTION

A composite rubber composition for a pneumatic tire comprising a reinforced vulcanizable composition is provided. The composition comprises a vulcanizable elastomeric matrix material having dispersed therein an effective reinforcing amount of springy fibers. The springy fibers can be from about 100 to 12,000 μm long, have a diameter of about 1.2 μm to 1,250 μm, have an aspect ratio of about 25 to 1000, and comprise about 1 to 10 phr (parts by weight per 100 parts by weight of the vulcanizable elastomeric matrix material). The springy fibers may comprise a polymer selected from the group consisting of nylon, polyester and polyolefin, and mixtures thereof.

A polyisoprene/polybutadiene rubber blend reinforced with 40 to 60 phr carbon black and 4 to 8 phr springy nylon short fiber has a tensile modulus at 50% of 2.0 to 7.0 MPa, a cut growth rate under 30%, dynamic shear strain of 0.5 to $0.9 \times 10^2$ mm/Mc, a hysteresis (as defined by the tangent of the phase angle at 50% strain) of 0° to 0.5, a molded groove tear strength of 13 to 22 N, a tensile strength of about 10–12 MPa, an ultimate elongation of 400–500% 500% and a Shore A hardness of about 60–65 points.

Also provided is a composition comprising a vulcanizable elastomeric matrix material having dispersed therein an effective reinforcing amount of springy fibers.

The springy fibers comprise about 1 to 10 phr (parts by weight per 100 parts by weight of vulcanizable matrix material ).

BRIEF DESCRIPTION OF THE DRAWINGS

FIG. 7 illustrates the cut growth rate of the various composites in the "A" direction.

FIG. 8 illustrates the cut growth rate of the various composites in the "W" direction.

FIG. 9 illustrates the averaged cut growth rate of the various composites.

DETAILED DESCRIPTION OF THE INVENTION

Figure 1:
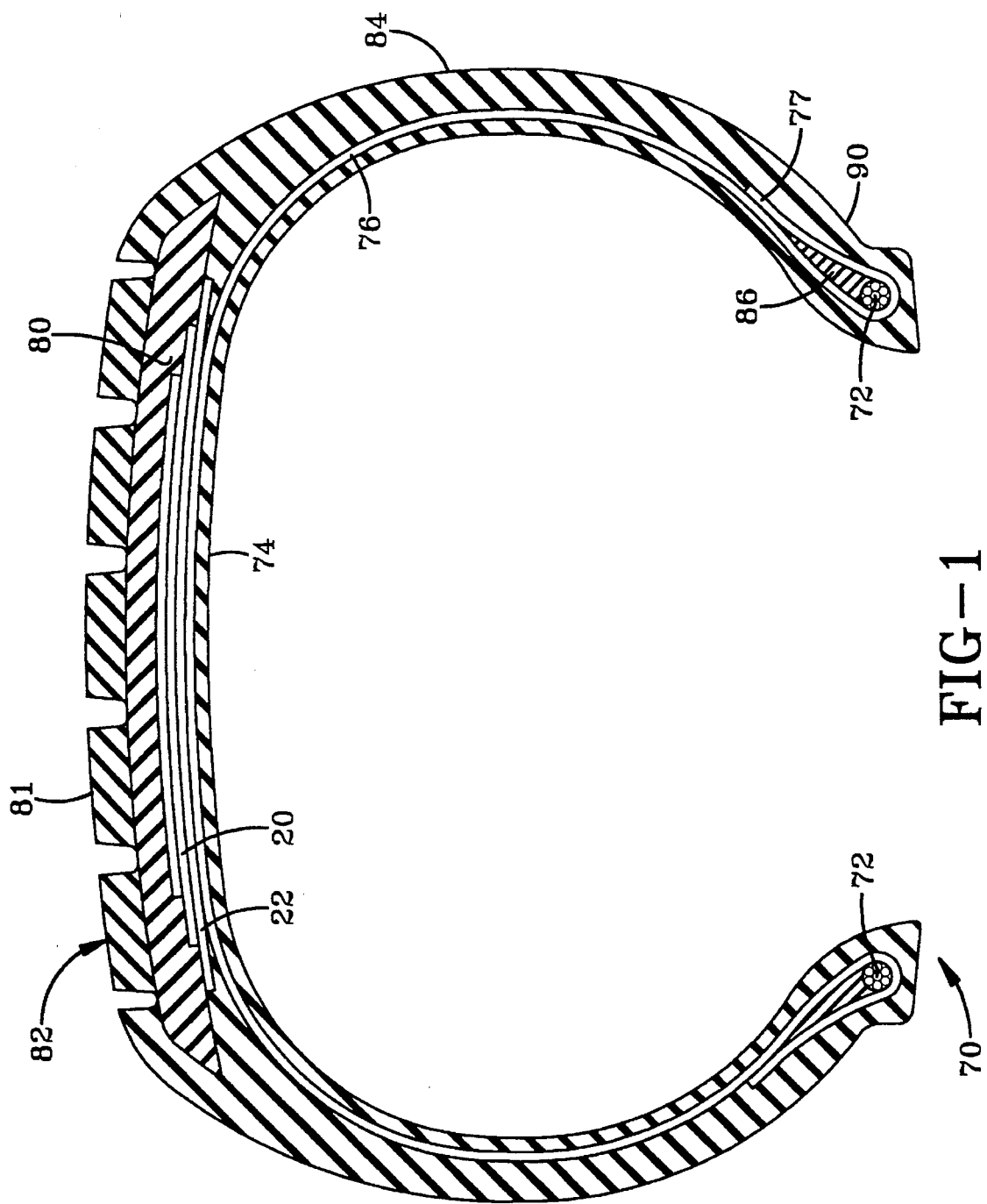
FIG. 1 illustrates a tire made using a reinforced elastomeric matrix of the invention.

When a crack is formed in an elastomeric material, a stress concentration will develop at the tip of the advancing crack. There are some well-documented stress dissipation mechanisms that will slow down the rate of crack growth. For example, (a) certain elastomers, notably cis-1,4-polyisoprene (natural rubber), crystallize upon stretching. In the highly stressed zone at a crack tip, crystallization takes place even when the overall strain is relatively small, and the energy dissipation accompanying crystallization leads to greatly enhanced tear strength;

(b) particulate fillers, notably carbon black, increase the tear strength of amorphous elastomers to a remarkable degree. It is generally conceded that reinforcement by fillers is due to major deviation of the tear direction augmented by an increase in viscous dissipation;

(c) energy dissipated as heat (hysteresis) will not be available to promote crack growth.

In the conception of the present invention, it was theorized that springy fibers can be used to improve the crack growth resistance of an elastomeric material. It is believed that the springy fibers will slow the rate of crack growth of an elastomer matrix incorporating such a fiber, by absorbing energy upon deformation and/or by strain induced crystallization. It is also believed that, as is the case with other short fibers, the springy fibers force deviation of the crack path, further slowing the rate of crack growth.

In one embodiment of the invention, in order to avoid processing problems encountered when using prior art macro fibers for elastomeric reinforcement, and to obtain a better balance of stiffness and tensile strength in a reinforced elastomer, and to reduce cut growth or crack propagation in a composite rubber material, it was proposed, in accordance with the present invention, to use a springy fiber in place of the fully oriented macro fibers used by the prior art.

Springy fiber comprises short fibers that exhibit a conformation that is capable of absorbing energy on deformation, and are capable of returning to their original conformation (i.e. exhibit rubber or spring like properties). This property of the fiber is provided by a stable twist, bend, or fold, for example, in the structure of the fiber. Examples of springy fibers are crimped fibers such as coiled, helical, spiral, and sawtoothed fibers.

Crimped fibers are currently in use in the carpet, furnishing, and apparel industries. Crimped fibers may include folded fibers, and the "crimps" may be formed in regular or irregular patterns.

Crimped fiber is made as described in U.S. Pat. No. 5,187,845 and references cited therein.

Other similar fibers are illustrated by:

1. "Textured Yarns" in "AF Encyclopedia of Textiles", 2nd Edition by the Editors of American Fabric Magazine, Prentice-Hall, Inc., 1972, p. 299 and p. 314, and
2. "The Production of Textured Yarns by Methods Other Than the False-Twist Technique", D. K. Wilson and T. Kollu, in Textile Progress, Vol. 16, No. 3, The Textile Institute, Manchester, UK, 1987.

Examples of fibers that may be crimped are nylon, polyester and polyolefin fibers. Specific examples of such fibers are nylon 6, nylon 66, nylon 46, polyethylene terephthalate, polyethylene naphthalate, polyethylene, and polypropylene.

The springy fibers of the invention have a length of about 100 to 12,000 μm, preferably 300 to 7,000 μm, a diameter of about 1.2 to 1,250 μm, preferably 1.5 to 300 μm, and an aspect ratio of 25 to 1000, preferably 25 to 300.

Other types of fibers that can be treated to have the desired properties include glass fibers, steel fibers, cotton fibers, carbon fibers, rayon and acrylic fibers. Other suitable fibers will be apparent to those skilled in the art.

In various embodiments of the invention, an elastomer composition employing springy short fibers can be used in various parts of a tire, for example in the sidewall of a tire, a gum strip or in a tread base compound.

Typically, an elastomer matrix containing springy short fibers has similar stiffness (elastic shear stiffness, tensile modulus) and lower cut growth rate, higher hysteresis, and similar hardness, tear strength, tensile strength and ultimate elongation properties as compared to an elastomer matrix which is reinforced with fully oriented short fibers. Thus it is possible to achieve nearly the same increase in stiffness using springy fibers, in a composite, other properties being equal, as it is using standard fibers, while obtaining significant advantages in cut growth resistance.

A carbon black filled elastomer loaded with 1 to 10 phr crimped Nylon 66 short fibers may have a tensile stress at 50% elongation of 3 MPa to 7 MPa when tested at room temperature and at a rate of 20 inches per minute. The cut growth rate may range from 0.5 to $0.9 \times 10^2$ mm/Mc tested at 30% strain cycle at a rate of 10Hz and tested at room temperature. The hysteresis, as defined by the tangent to the phase angle (tan delta) at those test conditions, may range from 0.2 to 0.5. The molded groove tear strength may range from 13 to 22 N. The tensile strength tested at the same conditions of such a carbon black filled elastomer may drop from 14 MPa down to 10 MPa by adding up to 10 phr of crimped Nylon 66 short fibers. The ultimate elongation may likewise decrease from 600% down to 400%.

For example, a natural rubber/polybutadiene rubber (PBD) blend reinforced with 50 phr of carbon black and 6 phr of crimped Nylon 66 fiber has a tensile modulus at 50% elongation of about 4 MPa, a cut growth rate of $0.5 \times 10^2$ mm/Mc, a tangent delta at 50% shear of about 0.4, a molded groove tear strength of about 17 N, a tensile strength of about 10 MPa, an ultimate elongation of about 450% and a Shore A hardness of about 62 points.

For purposes of comparison, the same natural rubber/ polybutadiene rubber and carbon black composition loaded with an equivalent amount of fully oriented Nylon 66 fibers has a tensile modulus at 50% elongation of about 5 MPa, a cut growth rate of about $0.6 \times 10^2$ mm/Mc, a tan delta at 50% shear of about 0.2, a molded groove tear strength of about 16 N, a tensile strength of about 11 MPa, an ultimate elongation of about 440% and a Shore A hardness of about 64 points.

Other elastomers that can be used in the invention include, but are not limited to, polyisoprene rubber (IR), styrene butadiene rubber (SBR), butyl and halobutyl rubbers (IIR, BIIR, CIIR), ethylene propylene rubbers (EPM, EPDM), crosslinked polyethylene (XLPE) and chloroprene rubbers (CR), nitrile rubbers (NBR), butadiene rubber, and blends or mixtures thereof.

It is believed that composites made using springy short fibers exhibit improved cut growth properties because the springy fiber provides an additional means of dissipating energy when the springy fiber is stretched or oriented when the rubber matrix surrounding the fiber is deformed.

As compared to a conventional particulate reinforced elastomer matrix, the hysteresis of the springy fiber reinforced composite increases and the set increases, while the resistance to cut growth, resistance to tearing, and resistance to crack propagation, and the strength of the composite, increase.

Springy short fibers, preferably nylon 66 or nylon 6, will provide some increase of low strain modulus and some decrease in ultimate elongation and tensile strength, and will also provide a readily available mechanism of energy dissipation upon deformation.

With reference now to FIG. 1, a tire 70 is illustrated which has been made with a fiber reinforced tread base 80 of the invention. The tread base 80 is incorporated in the tread 82 as it is co-extruded with the tread cap 81. The tread area of the tire may be reinforced with belts or breakers 20,22.

As is conventional in the art, the tire comprises a pair of beads 72 over which have been wrapped carcass plies 76. The turning-up of carcass plies 76 over beads 72 forms apex 86 between carcass 76 and turn up 77. When a tubeless tire is made, the tire will have an inner liner 74 disposed inwardly of carcass ply 76. Tire 70 may also have optional chafer 90. Sidewalls 84 substantially complete its construction.

The invention is further illustrated with reference to the following example.

EXAMPLE 1

In a series of six compounds, derived from a conventional sidewall/base rubber formulation, five different short fibers (including a low-elongation, e.g. fully oriented fibers), two high elongation (e.g. POY), and one crimped nylon-66 and a high elongation PET) were compounded and characterized. High elongation, in general, is defined as having an elongation of greater than 30%. Formulation variations are given in Table 1.

TABLE 1

| | CONTROL | FORMULATION VARIATIONS | | | | |
| --- | --- | --- | --- | --- | --- | --- |
| | | 1 | 2 | 3 | 4 | 5 |
| | | FIBER DESCRIPTION | | | | |
| MANUFACTURER | | MONSANTO | | | DUPONT | |
| TYPE ELONGATION | NONE | NYLON 15% | NYLON 151% | NYLON 40% CRIMPED | NYLON HIGH | PET HIGH |
| PHR FIBER | 0 | 6.00 | 6.00 | 6.00 | 6.00 | 7.26 |

Low strain viscoelastic characterizations (Rheometrics SIV strain sweeps) also were performed. Engineering properties were also obtained (up to 250% shear strain), along with ultimate properties (tearing energies and elongation). Fracture propagation rates were also assessed at 30% shear strain using specimen exhibiting preferential orientation imposed by milling conditions (with-(W), and against-(A)-the-grain). See Table 2.

Standard laboratory tests including ring tensile, dumbbell tensile, Strebler adhesion and molded groove tear strength were performed (see Table 3).

In the tables, MOD refers to modulus, elongation data is obtained at break, RT indicates room temperature, ENERGY (j) indicates the energy in Joules to break, TENSILE refers to tensile strength, MPa is megapascals, HARDNESS is given in Shore A units, IN AV LD means initial average load, SS means steady state, PK means peak, EC means entire curve and N refers to newtons. High means high elongation fiber, i.e. greater than 30% elongation, which is typical for POY nylon and POY polyester fibers.

TABLE 2

Low Strain Dynamic Properties Engineering Properties & Fracture Properties Summary

| | CONTROL | 1 | 2 | 3 | 4 | 5 |
|---|---|---|---|---|---|---|
| MANUFACTURER | | | MONSANTO | | DUPONT | |
| TYPE | NONE | NYLON | NYLON | NYLON | NYLON | PET |
| ELONGATION | | 15% | 151% | 40% CRIMPED | HIGH | HIGH |
| Set (A) | 4% | ← 12 to 14% → | | | | |
| Set (W) | 4% | ← 6 to 8% → | | | | 14% |
| Low Strain G' MPa | 1.5 | 2.0 | 2.0 | 2.1 | 2.0 | 2.1 |
| Low Strain G" MPa | .18 | .26 | .25 | .27 | .24 | .26 |
| Tan Delta at Low Strain | .120 | .130 | .125 | .129 | .120 | .124 |
| G' at 50% Strain MPa | | ← 0.3 → | | | | |
| G" at 50% Strain MPa | 0.05 | .07 | .07 | .13 | .07 | .12 |
| Tan Delta at 50% Strain | .17 | .23 | .23 | .43 | .23 | .40 |
| Ultimate Extension | | | | | | |
| Against Grain (A) % | 100 | 120 | 120 | 100 | 120 | 120 |
| With Grain (W) % | 100 | 170 | 160 | ← 150 → | | |
| Tear Energy Tc | | | | | | |
| Against Grain (A) N/cm | 120 | 190 | 180 | 150 | 180 | 170 |
| With Grain (W) N/cm | 120 | ← 220 to 230 → | | | | |
| Cut Growth Rate Average at 30% Strain × $10^2$ mm/Mc | 1.3 | 0.6 | 0.9 | 0.5 | 0.5 | 0.6 |
| Cut Growth Rate at 30% Strain (A) × $10^2$ mm/Mc | 1.4 | 0.2 | 0.6 | 0.2 | 0.2 | 0.4 |
| Cut Growth Rate at 30% Strain (W) × $10^2$ mm/Mc | 1.2 | 0.9 | 1.3 | 0.65 | 0.7 | 0.8 |

TABLE 3

Standard Laboratory Testing Results

| | CONTROL | 1 | 2 | 3 | 4 | 5 |
|---|---|---|---|---|---|---|
| MANUFACTURER | | | MONSANTO | | DUPONT | |
| TYPE | NONE | NYLON | NYLON | NYLON | NYLON | PET |
| ELONGATION | | 15% | 151% | 40% CRIMPED | HIGH | HIGH |
| RING TENSILE | | | | | | |
| 100% MOD MPa | 1.40 | 2.83 | 2.79 | 2.72 | 2.58 | 2.53 |
| 150% MOD MPa | 2.15 | 3.95 | 3.93 | 3.97 | 3.76 | 3.38 |
| 200% MOD MPa | 3.21 | 4.85 | 4.95 | 4.99 | 4.65 | 3.99 |
| 300% MOD MPa | 5.93 | 6.57 | 6.57 | 6.99 | 6.50 | 6.18 |
| TENSILE MPa | 13.55 | 10.22 | 9.6 | 10.33 | 9.94 | 9.38 |
| ELONGATION % | 618 | 494 | 465 | 469 | 480 | 464 |
| ENERGY J | 119.5 | 86.57 | 75.46 | 80.90 | 80.14 | 71.10 |

TABLE 3-continued

| | Standard Laboratory Testing Results | | | | | |
|---|---|---|---|---|---|---|
| CONTROL | | 1 | 2 | 3 | 4 | 5 |
| MANUFACTURER | | MONSANTO | | | DUPONT | |
| TYPE | NONE | NYLON | NYLON | NYLON | NYLON | PET |
| ELONGATION | | 15% | 151% | 40% CRIMPED | HIGH | HIGH |
| DUMBBELL TENSILE | | | | | | |
| W 50% MOD MPa | 0.84 | 4.87 | 4.56 | 4.04 | 3.99 | 2.76 |
| A 50% MOD MPa | 0.85 | 1.19 | 1.02 | 1.19 | 1.02 | 1.05 |
| W 100% MOD MPa | 1.40 | 4.9 | 4.5 | 4.09 | 4.12 | 2.9 |
| A 100% MOD MPa | 1.39 | 1.72 | 1.55 | 1.72 | 1.53 | 1.48 |
| W 150% MOD MPa | 2.2 | 5.1 | 4.54 | 4.32 | 4.27 | 3.3 |
| A 150% MOD MPa | 2.16 | 2.32 | 2.14 | 2.35 | 2.1 | 2.05 |
| W 200% MOD MPa | 3.32 | 5.42 | 4.83 | 4.78 | 4.75 | 4.05 |
| A 200% MOD MPa | 3.22 | 3.15 | 2.98 | 3.27 | 2.96 | 2.91 |
| W 250% MOD MPa | 4.65 | 6.15 | 5.6 | 5.76 | 5.72 | 5.13 |
| A 250% MOD MPa | 4.59 | 4.19 | 4.01 | 4.39 | 4.01 | 4.01 |
| W 300% MOD MPa | 6.09 | 7.23 | 6.85 | 6.98 | 6.9 | 6.38 |
| A 300% MOD MPa | 6.03 | 5.34 | 5.16 | 5.63 | 5.19 | 5.19 |
| W ELONG % | 606 | 436 | 456 | 449 | 471 | 494 |
| A ELONG % | 603 | 512 | 542 | 402 | 521 | 510 |
| W TENSILE MPa | 14.98 | 10.67 | 10.96 | 11.0 | 11.31 | 11.6 |
| A TENSILE MPa | 14.67 | 10.53 | 11.05 | 10.7 | 10.66 | 10.39 |
| COMPOUND TO COMPOUND ADHESION @ 95C (STREBLER) | | | | | | |
| IN AV LD N | 57.33 | 56.15 | 56.21 | 53.65 | 55.64 | 42.51 |
| SS AV LD N | 71.52 | 62.14 | 63.36 | 60.06 | 63.03 | 43.85 |
| SS PK LD N | 84.27 | 72.30 | 75.41 | 70.24 | 76.18 | — |
| AV LD EC N | 66.89 | 60.04 | 60.85 | 57.81 | 60.44 | 43.38 |
| | LARGE KNOTTY TEAR | SMALL KNOTTY TEAR, FIBER VISIBLE | SMALL KNOTTY TEAR, FIBER VISIBLE | SMALL KNOTTY TEAR, FIBER VISIBLE | SMALL KNOTTY TEAR, FIBER VISIBLE | SMALL KNOTTY TEAR, FIBER VISIBLE |
| MOLDED GROOVE TEAR STRENGTH | | | | | | |
| W AVE LD N | 14.35 | 15.97 | 16.73 | 16.79 | 16.19 | 13.62 |
| A AVE LD N | 10.46 | 21.44 | 17.82 | 19.17 | 15.00 | 13.08 |

Figure 2:
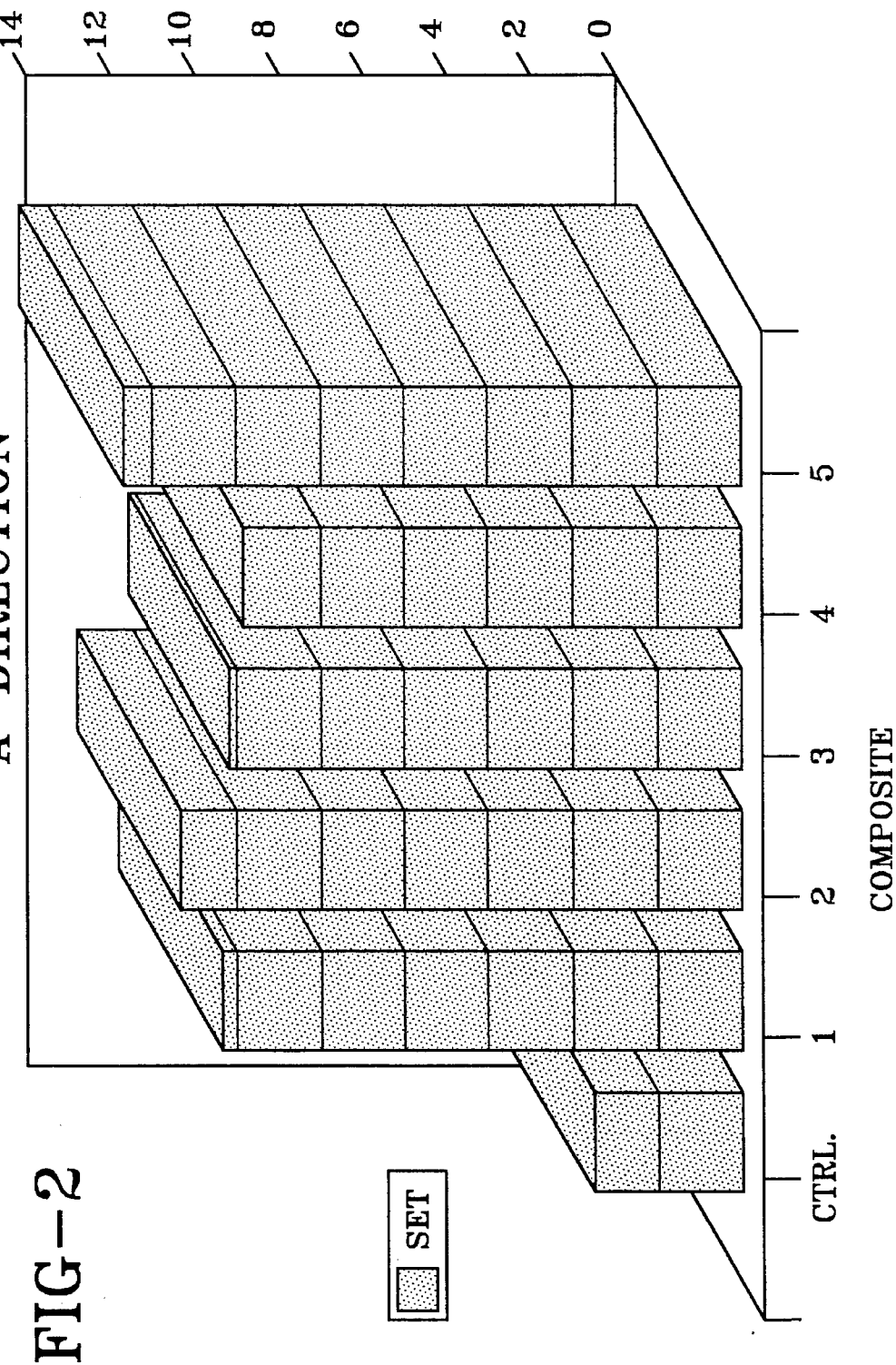
FIG. 2 is a graph illustrating the set properties of an elastomer loaded with various fibers as tested in the "A" direction (perpendicular to the direction of orientation of the fibers).
Figure 3:
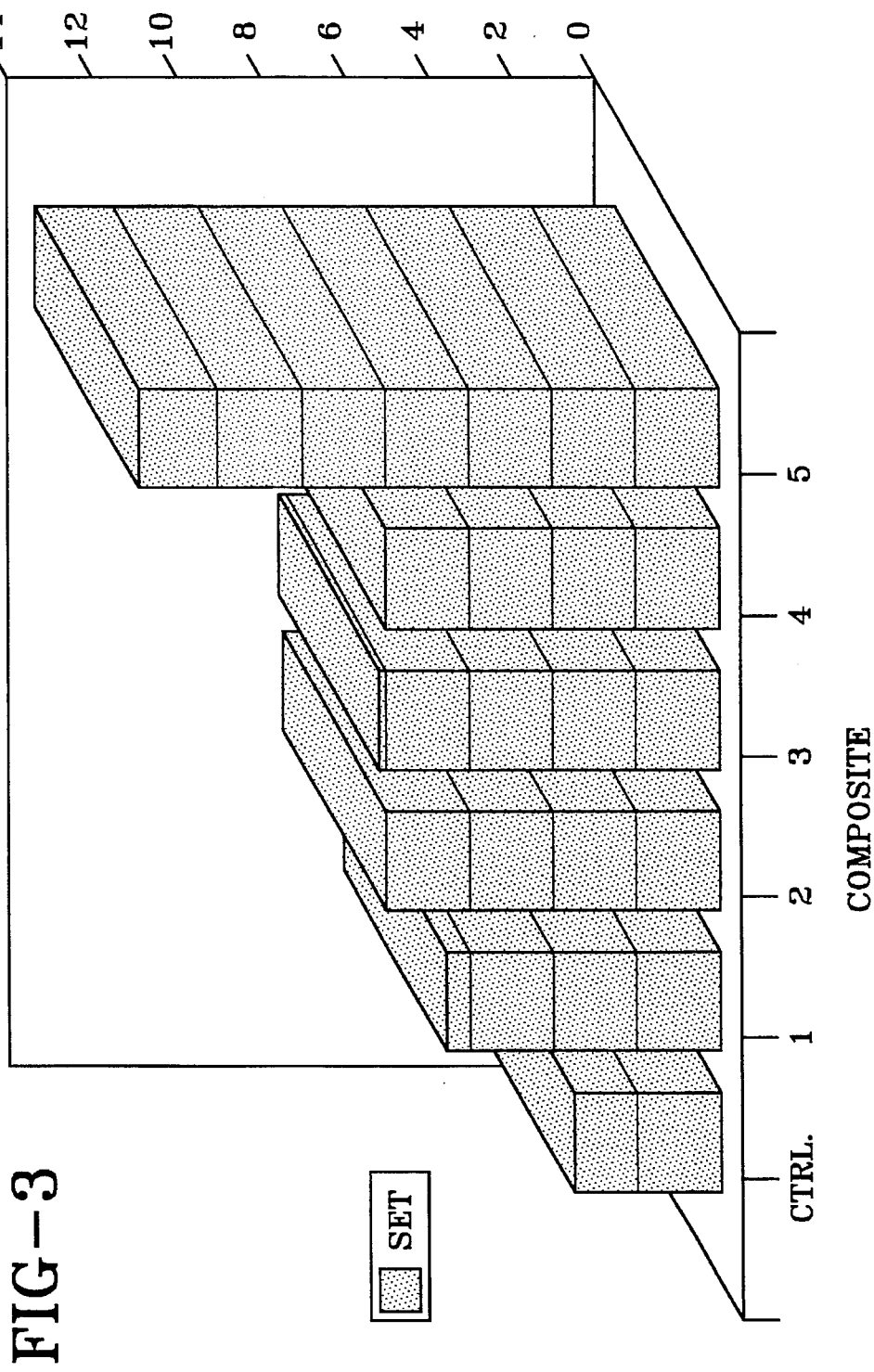
FIG. 3 is a graph illustrating the set properties of an elastomer loaded with various fibers as tested in the "W" direction (parallel to the direction of orientation of the fibers).
Figure 4:
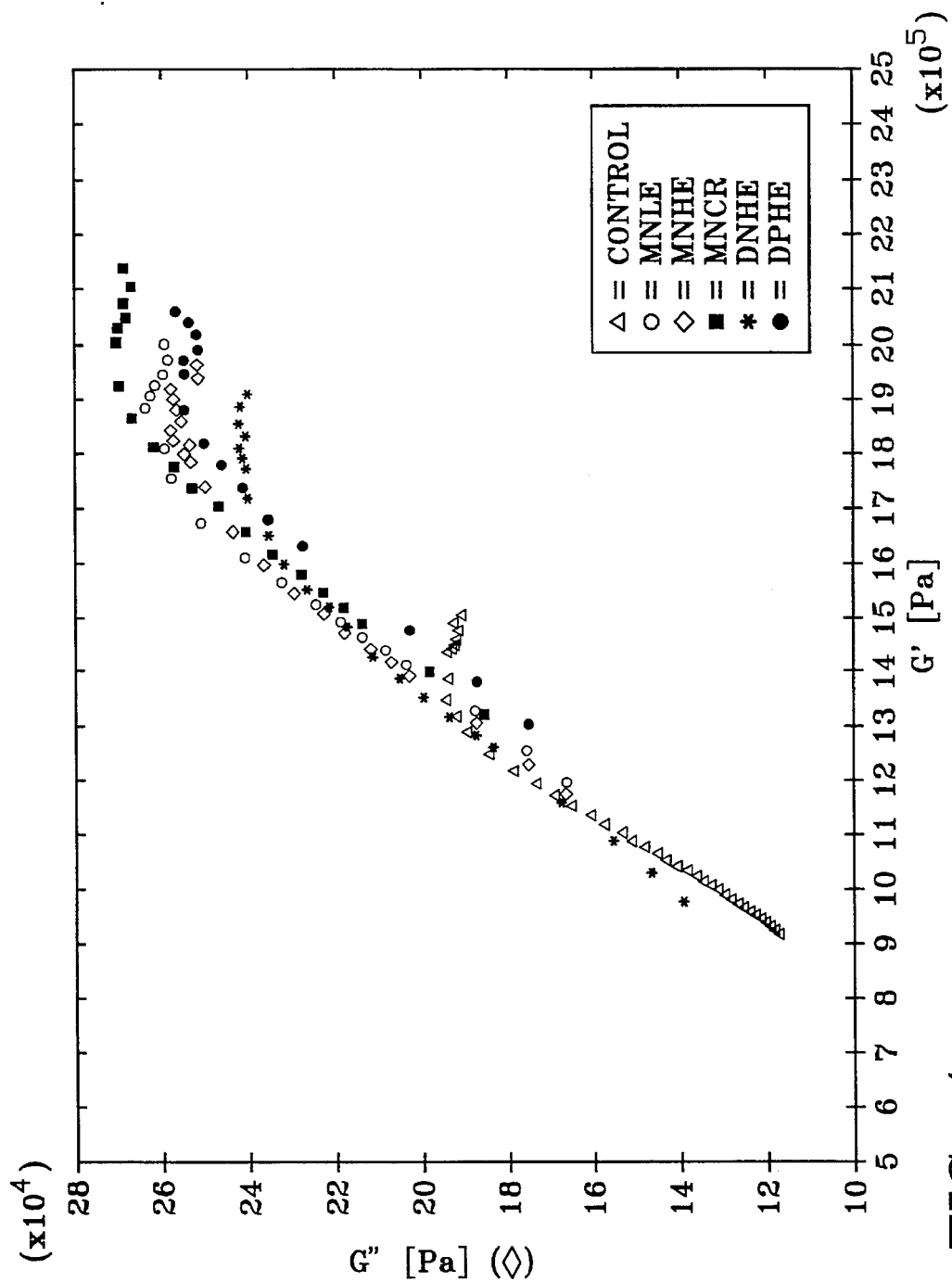
FIG. 4 compares the viscoelastic properties and hysteretic properties of the various composites.
Figure 5:
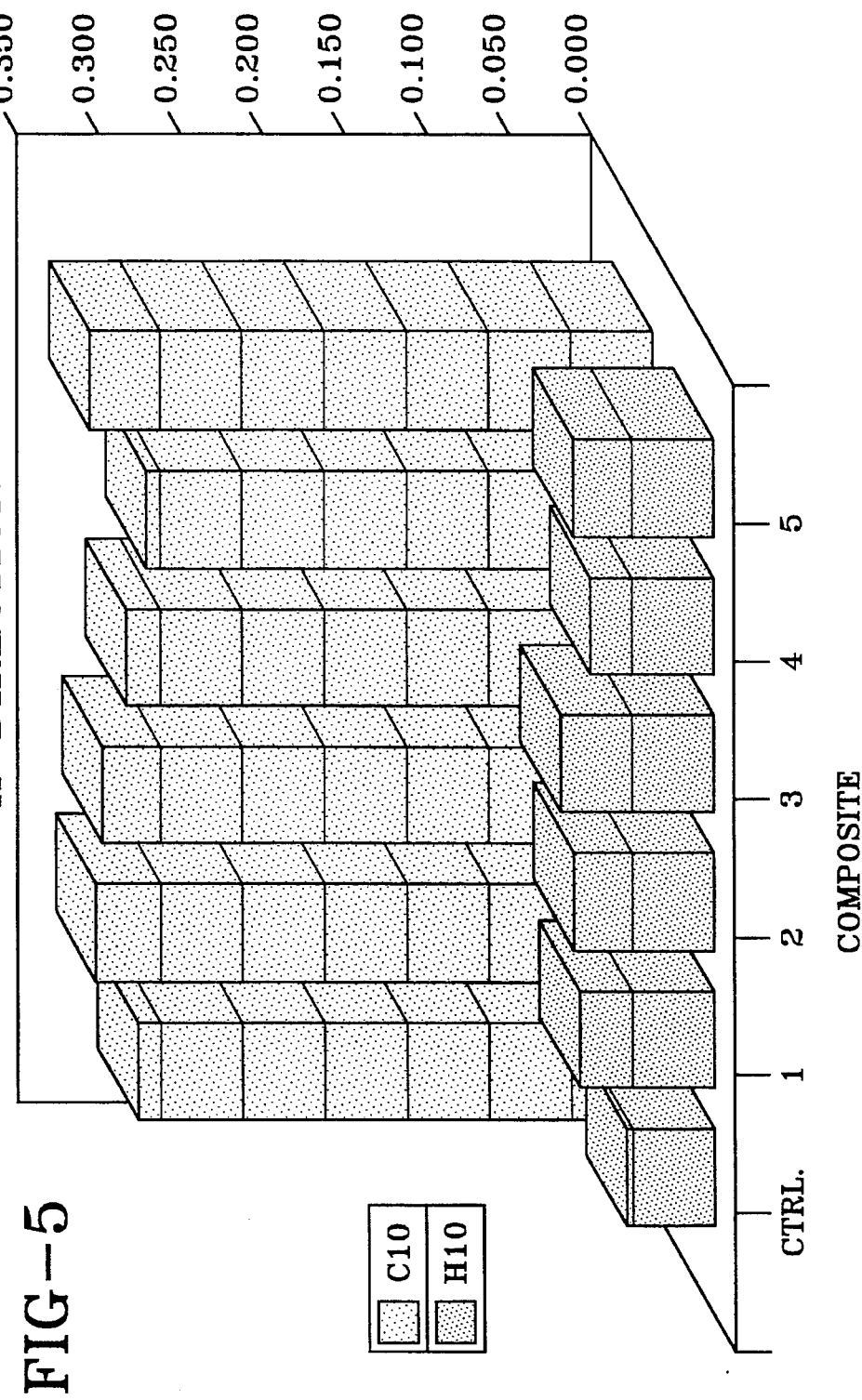
FIG. 5 illustrates elastic (C10) and loss (H10) energies observed in various composites in the "A" direction.
Figure 6:
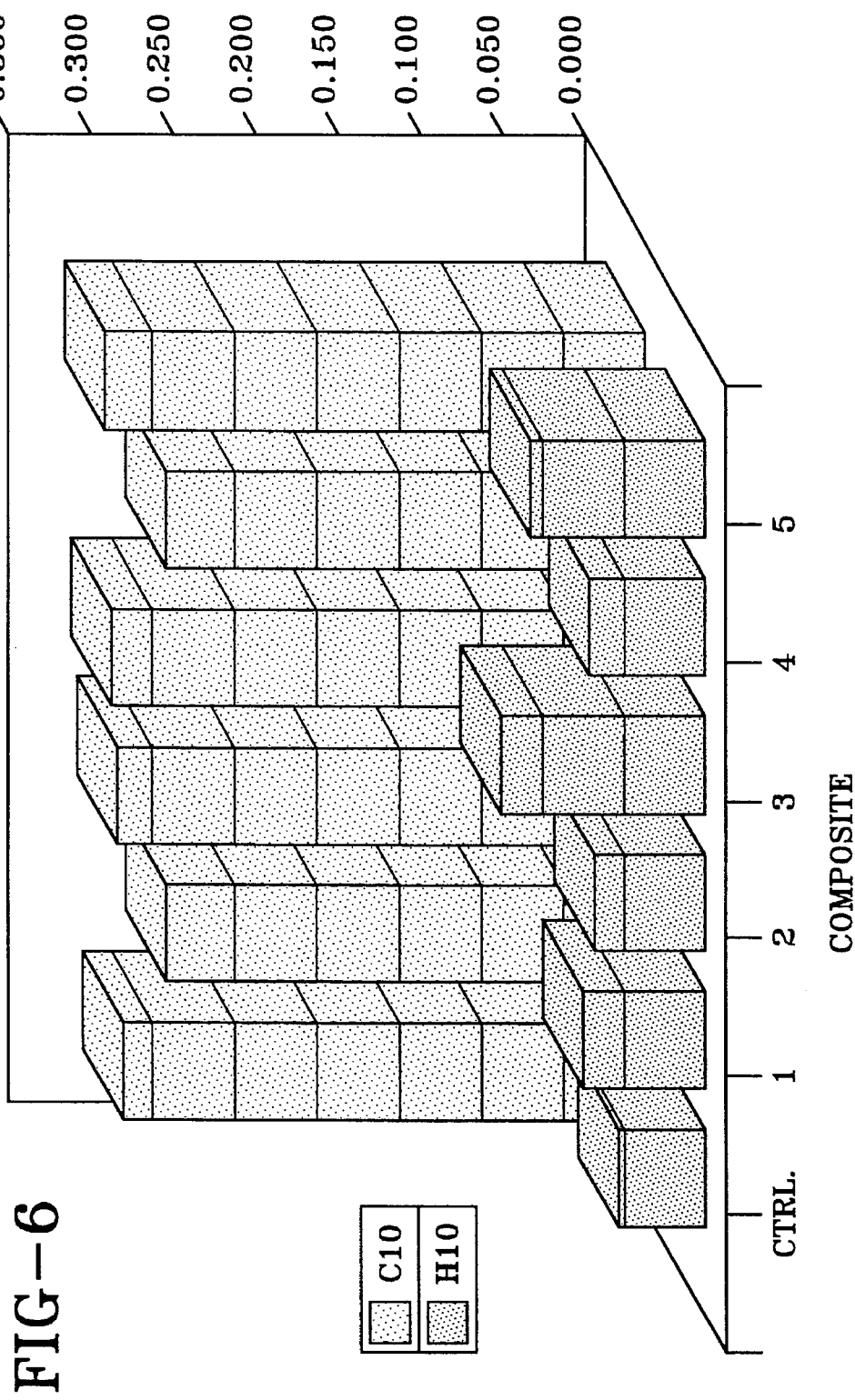
FIG. 6 illustrates the same properties as FIG. 5 in the "W" direction.

CONCLUSIONS:

a. Dynamic set and low strain dynamic elastic modulus results of the fiber loaded composites are similar to each other, but fiber loaded samples show significantly higher values than the fiber free control (at least double for set and 33% higher for G'). See FIGS. 2–4.

b. Low strain loss modulus (G") is significantly higher for the fiber filled compounds as compared to the fiber free control. Tan delta at 50% strain was increased in crimped nylon 66 and PET short fiber reinforced compounds, as compared to the other fiber reinforced compounds. Thus fiber type affects compound hysteresis. See Table 2. H10 increased in nylon 66 and PET short fiber reinforced compounds. See FIGS. 5–6.

c. Ultimate properties for all fiber loaded compounds were improved compared to the control: ultimate elongation (Eb) was improved 50% and catastrophic tearing energy (Tc) was improved 25 to 50%. See Table 2.

d. Improvement in fracture resistance was observed with all short fiber types, but the standard-nylon 66 showed large improvement only in the (A) direction. See FIGS. 7–9.

e. All nylon fibers, regardless of elongation or crimping, showed similar dumbbell 50% modulus in the (W) direction. The POY polyester reinforced compound showed higher dumbbell 50% modulus in the (W) direction than the fiber free control, but not as high as the nylon fiber reinforced compounds.

f. Compound to compound adhesion decreased in all the fiber reinforced compounds, particularly in the compound reinforced with partially oriented PET. Molded groove tear strength increased for all fiber reinforced compounds: it increased the most for the crimped nylon reinforced compound and increased the least for the partially oriented PET reinforced compound.

The decrease in the Strebler adhesion is due to the average orientation of the fibers parallel to the tear interface which prevents deviation of the tear.

The increase of the molded groove tear strength both with and against the grain is due to the average orientation of the fibers perpendicular to the crack direction which causes deviation of the tear. The average orientation of the fibers in the (W) direction sample are probably actually perpendicular to the tear due to flow of the rubber away from the groove during formation of the sample.

Among the nylon fibers, for their reinforcing properties in a rubber compound, the crimped fiber gave the best fracture resistance and was the least directional dependent. The partially oriented PET fiber provided fracture resistance properties that approached those of the crimped nylon fiber in a reinforced compound, but was not as reinforcing. Accordingly, the crimped nylon fiber provides the best balance of properties, maintaining a high modulus and providing better fracture resistance, with and against the grain.

While specific embodiments of the invention have been illustrated and described, those skilled in the art will recognize that the invention may be variously modified and practiced without departing from the spirit of the invention. The invention is limited only by the following claims.

What is claimed is:

1. A pneumatic tire including a component comprising an elastomeric matrix material having dispersed therein about 1 to about 10 phr artificially crimped synthetic organic springy fibers having a length of about 100 to 12,000 um, a diameter of about 1.2 to 1,250 um and an aspect ratio of 25 to 1000, said springy fibers being selected from the group consisting of nylon, polyethlene, polypropylene, polyester and mixtures thereof.

2. A pneumatic tire including a component comprising an elastomeric matrix material having dispersed therein about 1 to about 10 phr artificially crimped synthetic organic springy fibers having a length of about 100 to 12,000 um, a diameter of about 1.2 to 1,250 um and an aspect ratio of 25 to 1000, said springy fibers being selected from the group consisting of nylon, polyethylene, polypropylene, polyester and mixtures thereof, and in which said elastomeric matrix material is selected from the group consisting of polybutadiene rubber, polyisoprene rubber, styrene butadiene rubber, EPDM rubber, nitrile rubber, halobutyl rubber, and mixtures thereof.

3. The tire according to claim 2 wherein said springy fibers comprise about 4 to about 8 parts by weight per 100 parts by weight of said elastomeric matrix material.

4. The tire according to claim 2, wherein said component is a sidewall.

5. The tire according to claim 2 wherein said component is a tread base.

6. The tire according to claim 2 wherein said component is an apex.

7. The tire of claim 2 wherein said elastomeric matrix material comprises a polyisoprene/polybutadiene rubber mixture reinforced with 40 to 60 phr carbon black and 4 to 8 phr springy nylon fiber, said matrix having a tensile modulus at 50% strain of 2.0 to 7.0 MPa, a cut growth rate under 30% dynamic shear strain of 0.5 to $0.9 \times 10^2$ mm/Mc, a hysteresis (as defined by the tangent of the phase angle at 50% strain) of 0.2 to 0.5, a molded groove tear strength of 13 to 22N, a tensile strength of about 10 to 12 MPa, an ultimate elongation of 400 to 500% and a Shore A hardness of about 60 to 65 points.

\* \* \* \* \*